United States Patent
Voelz et al.

(10) Patent No.: US 10,044,205 B1
(45) Date of Patent: Aug. 7, 2018

(54) WIRELESS CHARGING CART AND CHARGING RACK

(71) Applicant: Borroughs Corporation, Kalamazoo, MI (US)

(72) Inventors: Dale W. Voelz, Portage, MI (US); Zachary M. McDonnell, Kalamazoo, MI (US); David K. Jacobs, York, PA (US)

(73) Assignee: Borroughs Corporation, Kalamazoo, MI (US)

( * ) Notice: Subject to any disclaimer, the term of this patent is extended or adjusted under 35 U.S.C. 154(b) by 79 days.

(21) Appl. No.: 15/257,420

(22) Filed: Sep. 6, 2016

Related U.S. Application Data (60) Provisional application No. 62/214,657, filed on Sep. 4, 2015.

(51) Int. Cl.
   *H02J 7/00* (2006.01)
   *H02J 7/02* (2016.01)
   *H02J 50/10* (2016.01)

(52) U.S. Cl.
   CPC .......... *H02J 7/0044* (2013.01); *H02J 7/0013* (2013.01); *H02J 7/0052* (2013.01); *H02J 7/025* (2013.01); *H02J 50/10* (2016.02); *B62B 2202/56* (2013.01)

(58) Field of Classification Search
   CPC ........ H02J 50/10; H02J 7/0013; H02J 7/0052; H02J 7/0044
   USPC .......................................................... 320/108
   See application file for complete search history.

(56) References Cited

U.S. PATENT DOCUMENTS

| | | |
|---|---|---|
| 5,505,473 A | 4/1996 | Radcliffe |
| 6,008,621 A | 12/1999 | Madison et al. |
| 6,218,796 B1 | 4/2001 | Kozlowski |
| 6,335,686 B1 | 1/2002 | Coff et al. |
| 6,354,493 B1 | 3/2002 | Mon |
| 6,714,121 B1 | 3/2004 | Moore |
| 7,055,833 B2 | 6/2006 | Wixted et al. |
| 7,130,190 B1 | 10/2006 | Baker |
| 7,156,475 B2 | 1/2007 | Gloger, Jr. |
| 7,160,113 B2 | 1/2007 | McConnell et al. |
| D547,920 S | 7/2007 | Kinsley et al. |
| D548,920 S | 8/2007 | Kinsley et al. |
| 7,262,700 B2 | 8/2007 | Hsu |
| 7,268,687 B2 | 9/2007 | Egbert et al. |
| D561,973 S | 2/2008 | Kinsley et al. |
| 7,325,891 B1 | 2/2008 | Kinsley et al. |
| 7,461,849 B2 | 12/2008 | Robbins et al. |
| 7,511,601 B2 | 3/2009 | Eisenberg et al. |

(Continued)

*Primary Examiner* — Sun Lin
(74) *Attorney, Agent, or Firm* — Gardner, Linn, Burkhart & Ondersma, LLP (57) ABSTRACT

A cart for charging and storing electronic devices having a frame defining opposed sides of the car and wheels to enable the cart to be movable. The cart includes a charging box having dividers that define receptacles configured to receive electronic devices, with each receptacle including a charger configured to charge an electronic device, with the charging box being pivotably mounted to the cart between the opposed sides of the cart whereby the charging box can pivot outwardly of the cart. The cart can further include a locking frame pivotably mounted to the cart above the charging box, with the locking frame being pivotable between an open position in which electronic items stored within the charging box are accessible by a user and a secured position in which electronic items stored within the charging box are inaccessible.

20 Claims, 10 Drawing Sheets

(56) References Cited

U.S. PATENT DOCUMENTS

| | | |
|---|---|---|
| 7,531,917 B2 | 5/2009 | Stone et al. |
| 7,556,271 B2 | 7/2009 | Robbins et al. |
| 7,595,995 B2 | 9/2009 | Hock |
| 7,611,157 B2 | 11/2009 | Robbins et al. |
| 7,800,914 B2 | 9/2010 | Dully |
| 7,844,770 B2 | 11/2010 | Petrick et al. |
| 7,888,913 B1 | 2/2011 | Mraty et al. |
| 8,040,221 B2 | 10/2011 | Murray et al. |
| 8,061,864 B2 | 11/2011 | Metcalf et al. |
| 8,066,242 B2 | 11/2011 | Potter et al. |
| 8,125,194 B2 | 2/2012 | Nethken |
| 8,125,316 B2 | 2/2012 | Moore |
| 8,190,806 B2 | 5/2012 | Petrick et al. |
| 8,243,455 B1 | 8/2012 | Raymond et al. |
| 8,269,605 B2 | 9/2012 | Moore |
| 8,294,417 B2 | 10/2012 | Kaye et al. |
| D671,703 S | 11/2012 | Guasta et al. |
| 8,320,110 B2 | 11/2012 | Chen |
| D675,208 S | 1/2013 | Petrick et al. |
| D675,622 S | 2/2013 | Petrick et al. |
| 8,373,383 B2 | 2/2013 | Dandekar et al. |
| 8,378,789 B2 | 2/2013 | Moore |
| D687,774 S | 8/2013 | Moore et al. |
| 8,503,182 B2 | 8/2013 | Petrick et al. |
| 8,657,312 B2 | 2/2014 | Guasta et al. |
| 8,752,848 B2 | 6/2014 | Petrick et al. |
| 8,870,195 B2 | 10/2014 | Guasta et al. |
| 8,909,839 B2 | 12/2014 | Petrick et al. |
| 8,916,991 B2 | 12/2014 | Petrick et al. |
| 8,934,254 B2 | 1/2015 | Petrick et al. |
| 8,935,011 B2 | 1/2015 | Tischer |
| 2002/0180588 A1 | 12/2002 | Erickson et al. |
| 2003/0111245 A1 | 6/2003 | Haggerty |
| 2006/0289444 A1 | 12/2006 | Jackson et al. |
| 2007/0049071 A1 | 3/2007 | Jackson et al. |
| 2007/0058344 A1 | 3/2007 | Baker |
| 2007/0084583 A1 | 4/2007 | Pan |
| 2011/0193524 A1 | 8/2011 | Hazzard et al. |
| 2011/0264927 A1 | 10/2011 | Dearborn et al. |
| 2012/0262120 A1 | 10/2012 | Dresser, III |
| 2013/0175993 A1 | 7/2013 | Chen |
| 2013/0277930 A1 | 10/2013 | Ergun et al. |
| 2013/0320916 A1 | 12/2013 | Jang et al. |
| 2014/0036419 A1 | 2/2014 | Prince et al. |
| 2014/0152238 A1 | 6/2014 | Racenet et al. |
| 2014/0175031 A1 | 6/2014 | Roberts |
| 2014/0245605 A1 | 9/2014 | Petrick et al. |
| 2014/0266024 A1 | 9/2014 | Chinnadurai et al. |
| 2015/0015190 A1 | 1/2015 | Tischer |

WIRELESS CHARGING CART AND CHARGING RACK

CROSS REFERENCE TO RELATED APPLICATION

The present application claims priority of U.S. provisional application Ser. No. 62/214,657 filed Sep. 4, 2015, which is hereby incorporated herein by reference in its entirety.

BACKGROUND AND FIELD OF THE INVENTION

The present invention is directed to a cart for charging and storing electronic devices, as well as a removable and portable rack for holding and charging multiple electronic devices simultaneously.

Portable carts are known for the use in transporting goods in a multitude of settings, including, industrial and educational settings. Such carts may include drawers for storing items as well as surfaces upon which items may be placed for transporting.

SUMMARY OF THE INVENTION

The present invention provides several embodiments of an apparatus for charging, storing, and securing electronic devices, such as personal electronic devices, but may be used with other electronic devices such as power tools and the like.

According to an aspect of the present invention, a cart with integrated charging and securing mechanisms is disclosed. The cart includes a mobile base storage area for personal electronic devices and other objects. A user can use the cart for wirelessly charging and securing personal electronic devices when the devices are not in use. Users may also move the cart, with the stored and secured devices, to desired locations using the mobile base. One or more charging boxes may be included in the cart, with the a pair of charging boxes being arranged in parallel and/or in line to one another. The charging boxes may be pivotably attached to the cart. Each charging box is divided into charging slots or receptacles to wirelessly charge electronic devices when the electronic devices are positioned proximal to a charger within each slot. The carts are configured to electrically connect many chargers to a power source, such as an AC wall outlet.

The carts may also include a working surface and storage areas. The working surface is generally at a height that facilitates users working on personal electronic devices and objects placed on the working surface. The working surface may be extendable using shelves. Furthermore, storage areas below the working surface increase the storage capacity of the cart. Each cart may have more than one type of storage area, depending on the intended purpose of the cart. For example, each cart may have at least one of a bin, drawer, surface, shelf, or additional tackle boxes. Each storage area, including the tackle boxes, can be configured to be locked by a user to secure personal electronic devices from theft and prevent unauthorized access.

Thus, the present invention discloses several embodiments of carts for charging, securing, and storing electronic devices, while also increasing increased mobility, ease of access, organization, and usefulness of personal electronic devices. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures. With initial reference to FIGS. 1-6, a cart 10 for charging and storing electronic devices, with the cart 10 including a mobile base 12 and at least one storage area 14 arranged above the base 12. As discussed in detail below, the cart 10 further includes a pair of charging boxes or tackle boxes 34 that are used with the cart for storing, charging, securing and moving electronic devices, such as personal electronic computing devices, including tablet computing devices or laptops 35, or alternatively for receiving power tools, or other chargeable electronic devices. The charging boxes 34 may be mounted to be pivotable within the cart 10 for aiding in access to the electronic devices and/or aiding access to associated wiring for the charging boxes 34. Still further, charging boxes 34 may be removable from the cart 10 for use separate and apart from the cart 10.

The mobile base 12 is generally square, although one would appreciate that the base 12 may be other geometric shapes, such as rectangular or circular. The base 12 has a bottom and a top surface, wherein wheels 16 are mounted to the bottom, and a frame 18 is attached to or integrally formed with the mobile base 12. Alternatively, the base may have side walls (not shown), wherein the frame is attached to the side walls and the top surface of the base. The side walls of the base, generally, are vertical walls at edges of the base to contain objects placed on the base, particularly when the cart 10 is moving.

The frame 18 is, generally, a skeletal-type frame that rises vertically from the mobile base 12, and includes vertical portions or members 20 and horizontal portions or members 22. The storage area 14 is formed within the vertical and horizontal frame members 20, 22. In the illustrated embodiment, the vertical portions 20 of the frame are attached at the sides of the base 12, particularly at corners of the base. Horizontal portions 22 are configured to connect the vertical portions 20. In the illustrated embodiment, the horizontal portions 22 generally extend horizontally at right angles between the vertical portions 20. However, one would appreciate that the horizontal portions 22 could be attached to at least one of the base 12 and storage areas 14. Thus, the horizontal portions 22 generally form the shape of the base 12. For example, the horizontal portions 22 form a square above the base 12 if the base 12 is shaped as a square. Furthermore, the vertical and horizontal portions 20, 22 are attached to the base 12 and other portions of the frame 18 by fasteners, for example, screws, bolts, snap attachments, and rivets. However, one would appreciate that the portions 20, 22 could be attached by features integrated with the frame 18, such as mounting tabs and slots (not shown).

The mobile base 12 is also configured to roll on a surface using wheels 16. In the illustrated embodiment, a set of wheels 16 are pivotal and are attached or fastened to the bottom of the mobile base 12. One pair of wheels 16 features a foot-activated brake lock 24. The other pair of wheels 16 features a foot-activated directional lock that will hold caster rotation in 90 degree increments. Each of the wheels 16 is generally positioned at the corners of the mobile base 12, for example, below the vertical portions 20 of the frame 18. Furthermore, the wheels 16 may be fixed, such that at least a pair of the set of wheels 16 are restricted to rotate in the same direction. Specifically, fixed wheels 16 are positioned in a parallel manner and side by side. Pivotable wheels 16 are configured to allow the cart 10 to turn when pushed by a user. For example, a pair of pivotable wheels 16 are positioned at the corners of the base 12, opposite the fixed wheels 16. Alternatively, the set of wheels 16 may be two pairs of pivotable wheels 16. However, one would appreciate that the mobile base 12 is also configurable to use other forms of movement, such as treads or castors (not shown).

The illustrated embodiment of the mobile base 12 is also configured to restrict movement of the cart 10. For example, users may desire the cart 10 to be stationary when the cart 10 is being stored, transported externally (such as in a van or truck), or being loaded or unloaded, such as with personal electronic devices. Thus, each wheel 16 of the mobile base 12 has lock 24 configured to restrict rotation of each respective wheel 16. Each lock 24 is operated by a foot tab, such that users press and release each wheel lock 24 to restrict movement of each respective wheel 16. For example, each wheel lock 24 may be locked and released individually to allow the cart 10 to pivot around one wheel, or at least one pair of the wheels 16 may be locked to keep the cart 10 in place.

The mobile base 12 also includes bumpers 26 configured to guard the cart 10 and surrounding objects from damage, and protect users from injury. In the illustrated embodiment, bumpers 26 are rubber members attached, for example, with fasteners, at the corners of the mobile base 12. However, one would appreciate that the bumpers may be along all of the edges of the mobile base 12. Additionally, bumpers 26 may be placed at other positions on the frame 18, such as at corners vertically above the mobile base 12. Furthermore, the bumpers 26 may be another material that will reduce the risk of injury to users or damage to the cart 10 and nearby objects, such as foam or soft plastics.

Figure 7:
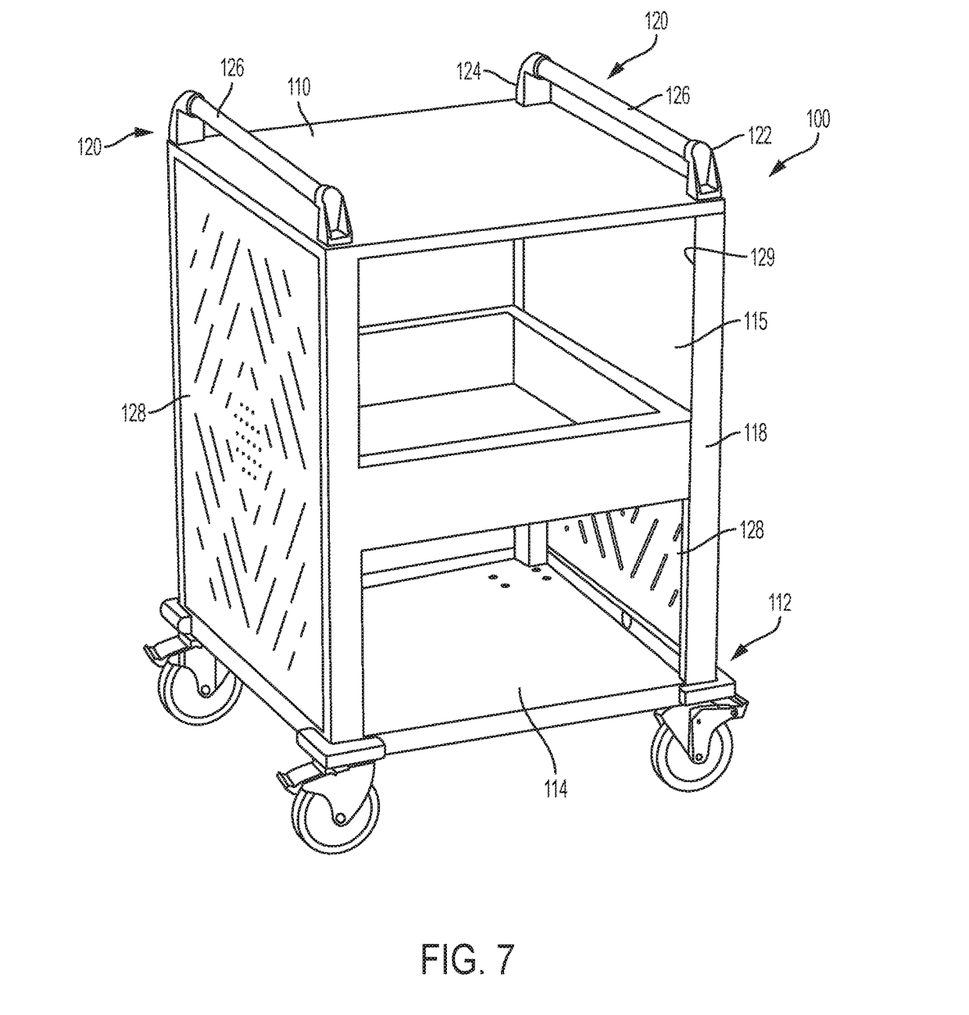
FIG. 7 is a perspective view of a second embodiment of a cart, according to an aspect of the present invention.

The illustrated embodiments of the cart 10 include side panels 28 on two opposing sides of the cart 10. The side panels 28 are configured to cover sides of the storage areas 14. Thus, the side panels 28 include at least one sheet, made of metal, plastic, wood, composite, or other useful material, that extend between the mobile base 12 and the top of the cart and horizontally between opposing portions of the frame 18. Some embodiments may include side panels having two sheets (see FIG. 7), defining an inner panel and an outer panel. Each side panel 28 is fixed or fastened to the frame 18 such that air, such as ambient air, may pass between the sheets to cool the electronic devices stored in the cart. At least one sheet of the side panels 28, such as the outer panel, has openings or cooling vents that are patterned to allow air flow while covering the storage areas 14. In addition, the cooling vents may be formed to have an aesthetically pleasing design, advertising, logo, or the like.

The cart 10 is also configured to manage and distribute electricity from a power source to personal electronic devices on the cart 10, such as in the storage areas 14. In the illustrated embodiment, shown in FIGS. 4 and 6, the cart includes a power receptacle or outlet 30 disposed between a set of cord wraps 32. The power outlet 30 and set of cord wraps 32 may be positioned adjacent a storage area 14 above the mobile base 12 (see FIG. 4), or on the mobile base 12 (see FIG. 6). The power outlet 30, for example, may be a three-prong AC power outlet, that is electrically connected to an internal power supply in the cart 10, such as a power unit 440 (FIG. 12) as discussed below, which may include or comprise a USB hub 31 (FIG. 10) to which individual chargers 38, discussed below, may be connected for charging of the electronic devices. The power outlet 30 is protected by a flexible sleeve and can be electrically connected to an AC power source, such as a wall outlet (not shown), with an electrical cable (not shown) to provide power to the cart 10. The cart 10 is also configured to store the electrical cable when it is not connected to a wall outlet. In the illustrated embodiment the electrical cable can be tightly wound around the cord wraps 32 to safely store the electrical cable when not in use, but still allows the cable to be available to be quickly electrically connected to the wall outlet and the cart 10 by users. As discussed below, the provision of electricity to cart 10 is used to charge electronic devices, such as devices that are stored in charging boxes 34. Alternatively and/or additionally, the cart 10 may include batteries that are initially charged when the cart 10 is plugged in to a power source, such as a wall outlet. Cart 10 may then be used to charge electronic devices remotely from a power source.

As previously noted, at least one embodiment of the present invention includes at least one charging or tackle box 34 (see FIGS. 1-4), which may also be referred to as charging racks or chassis. The illustrated embodiment, includes two tackle boxes 34 arranged in parallel to another and pivotably attached adjacent to the storage area 14. The tackle boxes 34 are configured to receive, store, and charge personal electronic devices. Each tackle box 34 is divided into charging slots 36, as discussed below, which in the illustrated embodiment are configured to inductively charge electronic devices when each device is positioned proximal to a charger 38 within each slot 36.

Figures 5, 5A:
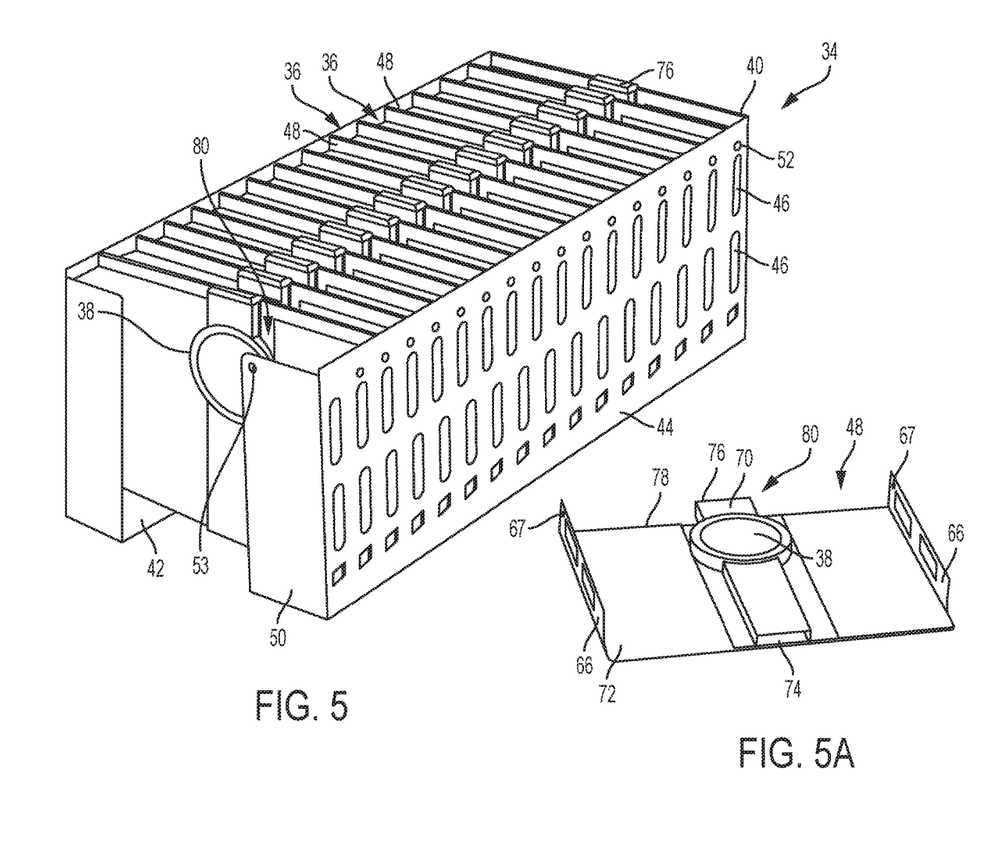
FIG. 5 is a perspective view of a tackle box removed from the cart disclosing the dividers, according to an aspect of the present invention.
FIG. 5a is a perspective view of a divider removed from the tackle box of FIG. 5.
Figure 6:
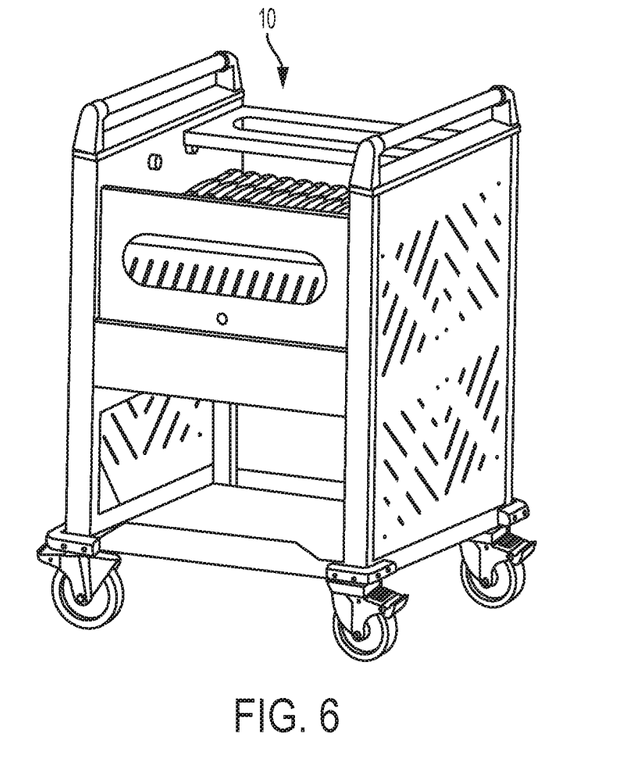
FIG. 6 is a perspective view of many carts with two tackle boxes, wherein for each cart, one tackle box is unlocked and one tackle box is locked, of FIG. 1.

As shown in FIG. 5, each tackle box 34 has a top portion 40, bottom portion 42, and side members or portions 44a, 44b. The side portions 44a, 44b of the tackle boxes 34 include openings 46 for facilitating airflow to cool electronic devices stored therein (such as shown in FIGS. 1-4). The top portion 40 of the tackle box 34 is open with multiple dividers 48 being disposed within the box 34 and separating the side portions 44a, 44b to form receptacles or openings of slots 36 for receiving electronic devices therein. End portions 50 at least partially cover ends of the tackle box 34. Thus, the end portions 50 may expose a slot 36 and divider 48. In the illustrated embodiment, the end portions 50 are integrally formed with the side portions 44a, 44b of the tackle box 34, such that the end portions 50 are formed by bending each end of the side portions 44a, 44b substantially into a right angle. However, one will appreciate that the end portions 50 may be joined to the bottom portion 42 or side portions 44a, 44b, substantially at right angles, to at least partially cover ends of the tackle box 34. In the illustrated embodiment the side portions 44a, 44b, end portions 50 and dividers 48 are formed from metal that is bent into shape. Side portions 44a, 44b, moreover, are separately formed and joined with mounting tabs 66 located on the dividers 48, as discussed in more detail below. It should be appreciated, however, that the boxes 34 including dividers 48 may be constructed of alternative materials, such as molded plastics and the like. As previously noted, the tackle box 34 is configured to attach to the cart 10. For example, the tackle boxes 34 may be secured to the cart by a hinge 54 (FIG. 2) secured to one of the side portions 44a, 44b and to the cart 10, such as to a horizontal frame member 22, to thereby enable the boxes 34 to pivot. Alternatively, the charging cart may be provided with apertures, such as aperture 53, to receive fasteners on the end portions 50 of the tackle box 34 to fasten to the vertical frame members 20 or to the side panels 28 of the cart 10, in which case tackle box 34 would be fixed to cart 10 to prevent rotation thereof. Still further, one of the side portions 44a, 44b may be provided with an aperture on both longitudinal end portions 50, with the apertures being generally similar to aperture 53, but that are alternatively located to be lower than aperture 53, and configured to receive a shaft or pin extending into, for example, respective vertical frame members 20. In such an embodiment tackle box 34 would then be pivotable about the shaft or pin.

The bottom portion 42 at least partially covers the bottom of the tackle box 34. Thus, the bottom portion 42 may expose a slot 36 and divider 48 and provides an opening for allowing power cords to be routed to chargers 38, as discussed in more detail below. In the illustrated embodiment, the bottom portion 42 is integrally formed with the side portions 44a, 44b of the tackle box 34, such that the bottom portion 42 is formed by bending the bottoms of the side portions 44a, 44b substantially into a right angle. However, one will appreciate that the bottom portion 42 may be joined to the end portions 50 or side portions 44a, 44b, substantially at right angles, to at least partially cover the bottom of the tackle box 34. The bottom portion 42 may include apertures (not shown) for fasteners on the bottom portion 42 of the tackle box 34 to fasten to one of the storage areas 14 of the cart 10.

Tackle boxes 34 may be constructed of different sizes and configurations for use with alternatively sized and shaped electronic devices. For example, an alternative number of dividers 48 may be located between side portions 44a, 44b with larger or smaller spacing there between. To this end, side portions 44a, 44b may be provided with a plurality of mounting apertures 52 for receiving fasteners to mount dividers 48 at alternative locations between side portions 44a, 44b. As discussed below, dividers 48 include apertures 67 on mounting tabs 68, where apertures 67 are configured to be aligned with apertures 52 for securing of dividers 48 to side portions 44a, 44b. Still further, bigger or smaller dividers and/or side portions may be employed as needed.

As noted, each tackle box 34 is also configured to pivotably rotate relative to the cart 10. In the illustrated embodiment, a hinge 54, such as a piano hinge, couples the tackle box 34 to the cart 10 (see FIG. 1). The hinge 54 is generally located at an outer edge of one of the storage areas 14 so that each tackle box 34 pivots outward from the cart 10 and at least partially exposes the storage area 14 (see FIGS. 2, 10). The ability of boxes 34 to pivot outwardly promotes access to wires 39 (FIG. 10) that are routed from the chargers 38 toward the bottom of the cart, such as to a USB hub. Although only one wire 39 is shown for a charger 38 in FIG. 10, it should be appreciated that each charger 38 may include a wire. One would appreciate that the hinge 54 may be other types of latches, such as butt hinges, concealed hinges, or articulating arms. When rotated, a side member 44a, 44b of the tackle box 34 is supported on the horizontal frame member 22. Alternatively, apertures may be provided on both longitudinal ends of a tackle box 34, with corresponding and aligned apertures provided on the vertical frame members 20 between which the tackle box 34 extends. A shaft or pin disposed through the apertures may then be provided to pivotably support the tackle box 34.

Furthermore, the cart 10, and specifically the tackle boxes 34 and frame 18 are configured to securely store personal electronic devices using a locking mechanism or frame 56. In the illustrated embodiments, the locking frame is a pivotable panel or door 56 (see FIGS. 1-4). Each door 56 secures the personal electronic devices by at least partially covering the personal electronic devices and tackle boxes 34 to prevent unwanted removal of the tackle boxes 34 from the cart 10 and/or removal of electronic devices from the tackle boxes 34. Doors 56 are mounted to cart 10 vertically above boxes 34 to enable boxes 34 to pivot outwardly, but still function to retain electronic devices 35 therein when doors 56 are closed.

The door 56 includes cross member portions 58 and intermediate members 60, with one of the cross members comprising a locking member or portion 62. The door 56 is pivotally connected to the frame 18 by pins or shafts 57 (one shown in FIG. 2) to enable door 56 to swing about cross member portion 58. That is, in the illustrated embodiment, the shaft 57 is disposed adjacent the elongate edge defined by the cross member portion 58 to pivot thereabout. In addition in the illustrated embodiment, the door 56 is a unitary piece with the pivoting member 58 and the locking member 62 being substantially parallel to one another and with the intermediate members 60 extending there between. An opening is formed in the door 56, which is formed by the configuration of the pivoting member 58, locking member 62, and integrated intermediate members 60. In the illustrated embodiment, the opening is an oval and when the door 56 is positioned in the locked position of FIG. 1 the electronic devices stored in the tackle boxes 34 are viewable, such as to see the status of the charging of the devices. Nevertheless, the door secures tackle box 34 to the cart 10 and secures the electronic devices within the tackle box 34. The door 56 is moveable into an open position (FIG. 3), or may be removable, to enable access to the charging box 34. Stops 65 (FIG. 3) may be provided against which the door is supported in the closed of locked position.

Figure 1:
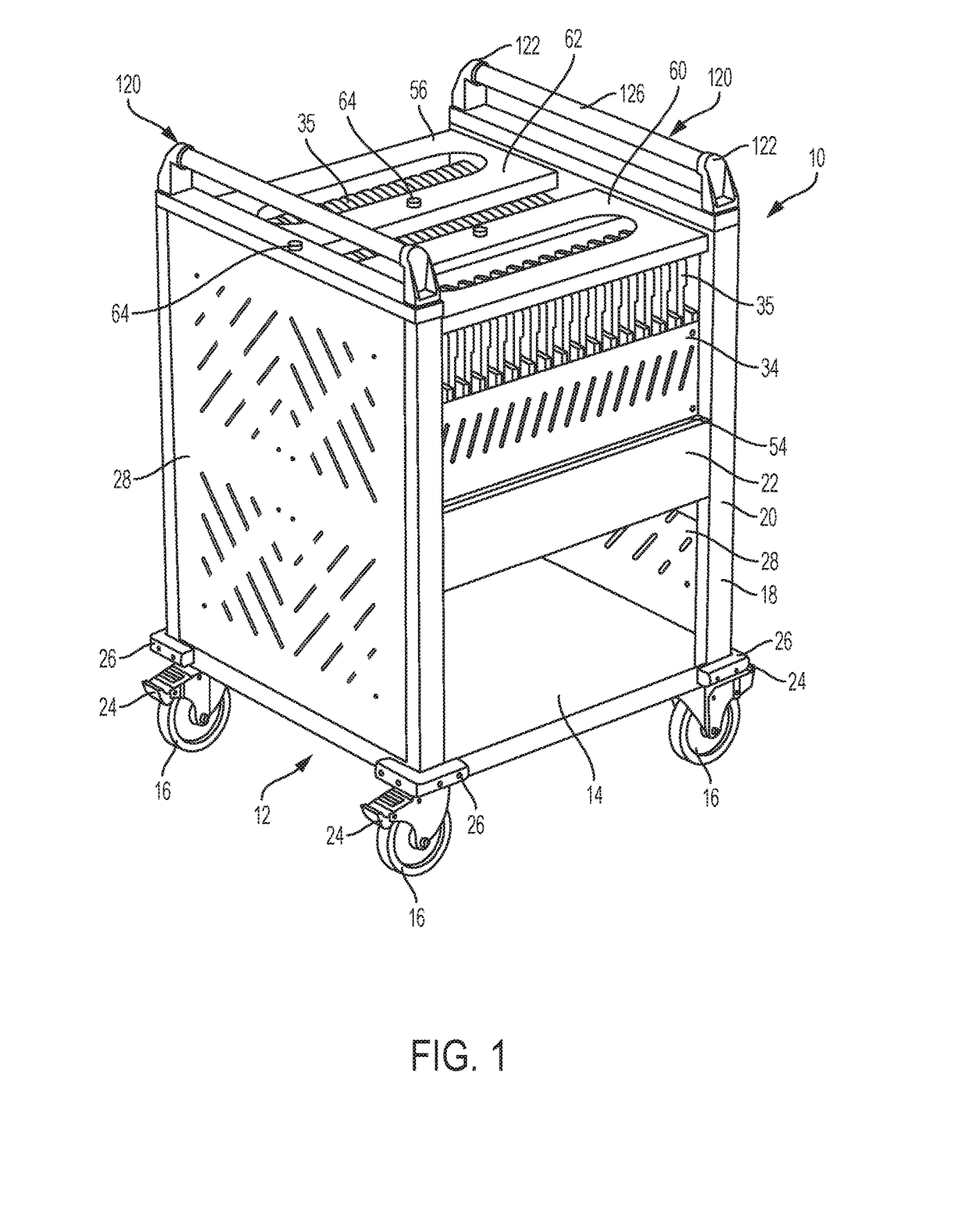
FIG. 1 is a perspective view of a first embodiment of a cart with two tackle boxes in a locked position, according to an aspect of the present invention.
Figure 2:
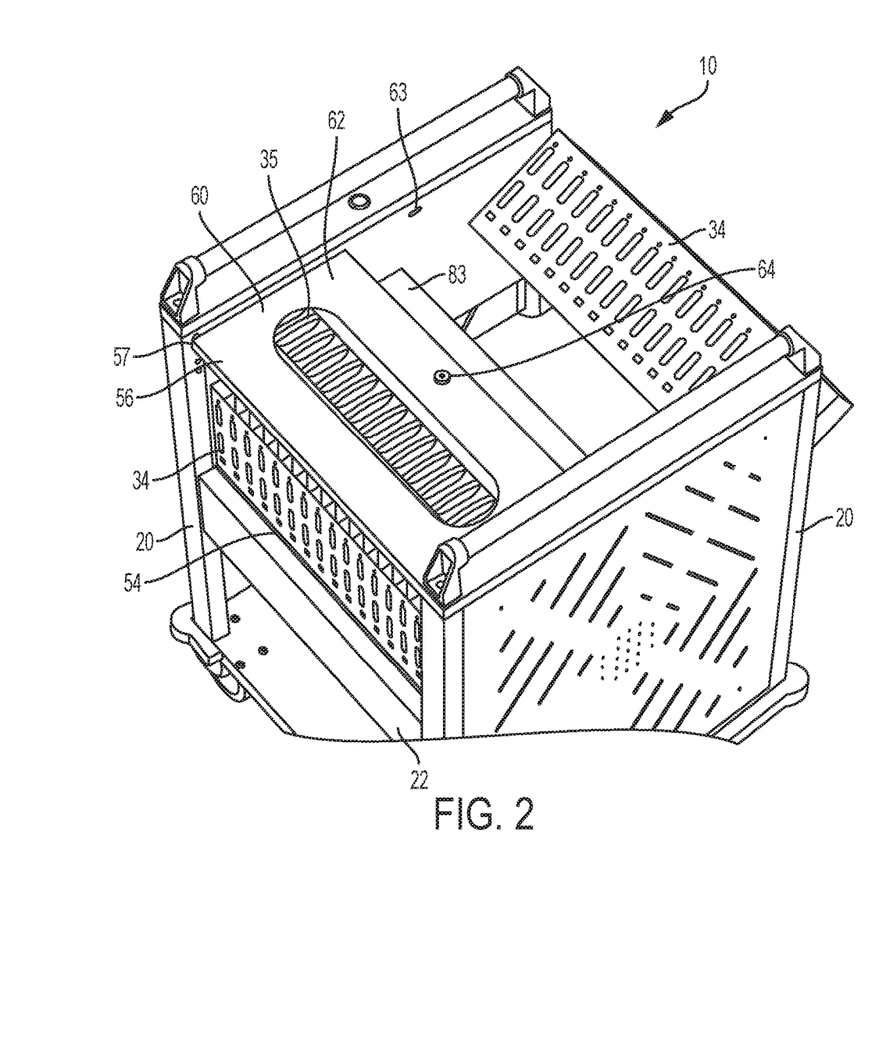
FIG. 2 is a perspective view of the cart with two tackle boxes, wherein one tackle box is locked and one is pivoted outward, of FIG. 1.
Figure 3:
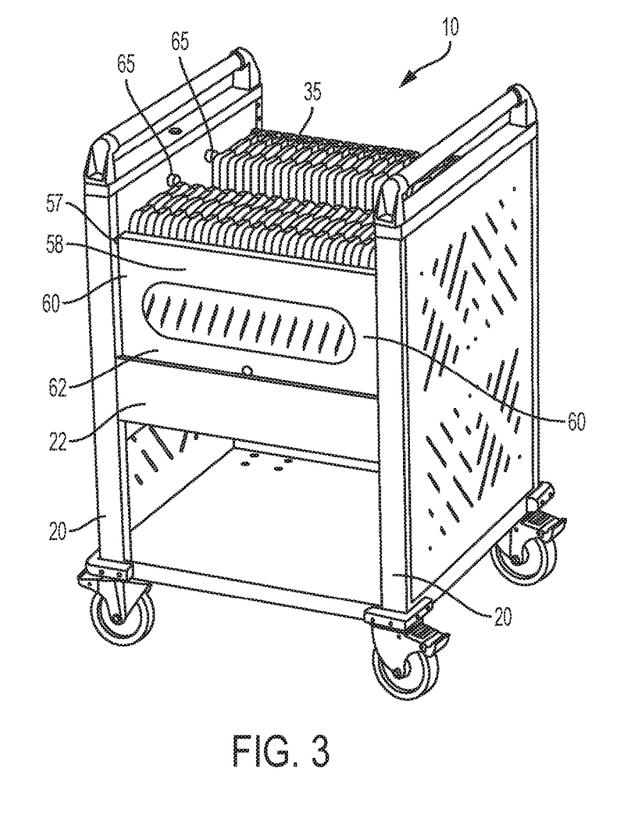
FIG. 3 is a perspective view of the cart with two tackle boxes, wherein both tackle boxes are unlocked, of FIG. 1.
Figure 4:
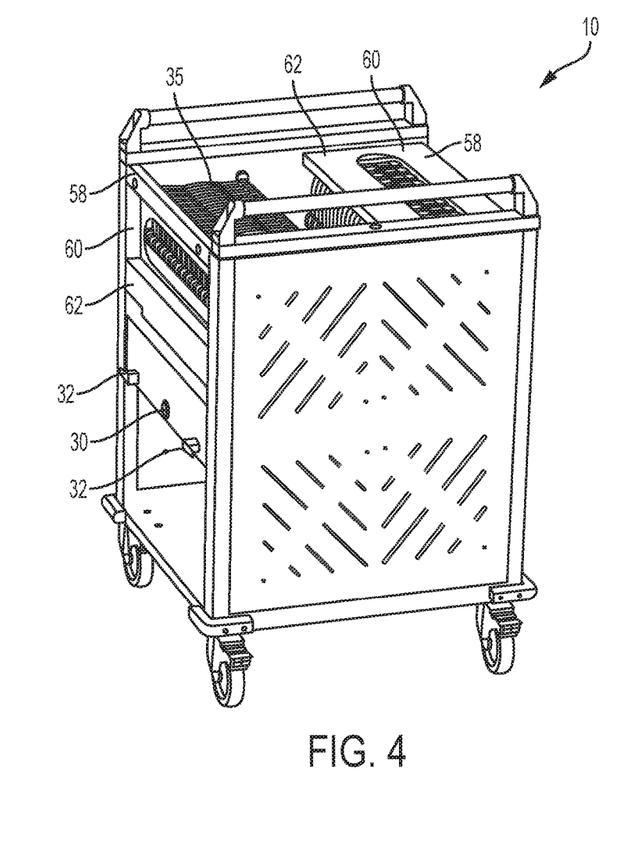
FIG. 4 is a perspective view of the cart with two tackle boxes, wherein one tackle box is unlocked and one tackle box is locked, of FIG. 1.

The locking member 62 secures tackle box 34 to the cart 10 and secures the personal electronic devices within the tackle box 34 by being locked in a position covering the tackle box 34 and personal electronic devices (see FIG. 1). At least one lock 64 is disposed on the cart, such as on the door 56 or at an end adjacent the locking member 62 on the frame 18. Specifically, the frame 18 has at least one locking point, such as an aperture, wherein the user turns the lock 64 with a key to engage the lock 64 within the at least one locking point. Thus, the door 56 is locked in place and the personal electronic devices are secured to the cart 10. In an alternative embodiment, a lock 64 is disposed on the locking member 62, but the lock is configured to engage locking points, such as apertures 63 (FIG. 2), on both opposing sides of the frame 18 using extended locking members that are turned by the key simultaneously, where a rod or bar or the like projects into the apertures 63.

As noted, the tackle box 34 is configured to store and charge personal electronic devices using at least one divider 48 (see FIGS. 5, 5a). Each divider 48 has a top, bottom, front, and rear portions. Furthermore, each divider 48 is mounted in the tackle box 34 using mounting members, such as mounting tabs 66. Generally, the mounting tabs 66 are vertically-oriented. The mounting members 66 are generally configured to removably attach the dividers 48 to the side members 44a, 44b of tackle box 34. In the illustrated embodiment, each divider 48 is mounted vertically. However, one would appreciate that each divider 48 may be mounted horizontally or at an angle. Moreover, it should be appreciated that tackle box 34 may be removable from cart 10 whereby tackle box 34 is useable separate and apart from cart 10. Still further, although the two tackle boxes 34 of cart 10 are shown arranged in parallel to each other it should be appreciated that alternative arrangements may be provided. For example, the tackle boxes may be disposed in a stacked arrangement in which one is above the other. Or more than two such tackle boxes may be provided, either in a stacked arrangement or linear, including parallel arrangements of multiple end-to-end tackle boxes.

In the illustrated embodiment, each divider 48 is formed of multiple pieces. For example, each divider 48 has a central portion 70 and outer portions 72 connected thereto. The outer portion 72 is formed by left and right outer portions on either side of the central portion 70, with both the left and right outer portions including a mounting tab 66, such that the divider 48 is substantially symmetric across the central portion 70. When each divider 48 is positioned in the tackle box 34, the central portion 70 has a generally vertical orientation. Thus, the central portion 70 has a top and a bottom, and is configured to conceal wiring from the charger 38 to the power block (not shown).

In the illustrated embodiment, the central portion 70 forms a channel 74, which may have many cross-sectional shapes, such as U-shaped, arcuate, square, or rectangular. In the illustrated embodiment, the shape of the channel 74 is formed by bending a metal sheet into the channel 74 shape, such that the central portion 70 resembles a rectangular shape. However, one would appreciated that the channel 74 may be formed by other methods, such as joining metal sheets. The channel 74 is covered by a cap 76 to prevent objects and dirt from falling into the top of the central portion 70, and/or for covering wiring disposed therein. In the illustrated embodiment, the cap 76 is frictionally fit to the top portion of the channel 74, however, one would appreciate that the cap 76 could cover the channel 74 by other securing features, such as by fasteners. Furthermore, the central portion 70 of each divider 48 has a reinforcing portion 78 configured to increase the rigidity of each divider 48. In the illustrated embodiment, the reinforcing portion 78 is at the top of the central portion 70 and extends between the central portion 70 and the mounting tabs 66. The reinforcing portion 78 is formed of a strip that is bent over the top of the divider 48 from the front to the back. Thus, the reinforcing portion 78 also provides the top of the divider 48 with a generally rounded and blunt edge, rather than sharp.

Each divider 48 of the tackle box 34 is configured to charge at least one electronic device. In the illustrated embodiment chargers 38 comprise induction chargers. Alternatively, however, chargers 38 may comprise capacitive, resonance or power cord chargers.

Wiring from each charger 38 electrically couples each charger 38 on a respective charger mount 80 of the central portion 70 of each divider 48 to the power supply through the bottom of the central portion 70, with the wiring for the charger 38 extending within the channel 74 and out to central area 82 (FIG. 10) of the cart for connection with USB hub 31. Each charger mount 80 is generally integrated into the U-shaped channel 74 of the central portion 70. For example, the charger mount 80 may be a cutout formed into the central portion 70, wherein the cutout has the same shape as the charger 38. Thus, the charger 38 may be frictionally attached to the charger mount 80. The charger mount 80 is generally positioned vertically on the central portion 70 to allow for efficient charging of the personal electronic device. Generally, efficient charging occurs when the charger 38 is proximal to a charging transducer (not shown) of the personal electronic device, rather than distal from the where the charging transducer of the personal electronic device. Thus, the charging mount 80 may be positioned according to a design of each specific personal electronic devices. Alternatively, the charging mount 80 may be positioned in a universal position, such that the charger 38 efficiently charges most personal electronic devices. A cover member 83 may be positioned within central area 82 of a cart for covering wires disposed therein that extend from chargers 38 to USB hub 31.

The cart 10 may additionally be provided with an identification reader/system, such as a radio frequency identification ("RFID") reader system, whereby as individuals remove an electronic device from the charger box the device can be "checked out" or logged to a particular user. This embodiment may include the use of a computer or controller mounted to the cart 10 and RFID tags or the like affixed to the individual electronic devices, with a user logging in or providing an identification card or the like to the computer.

Figures 11, 11A, 11B:
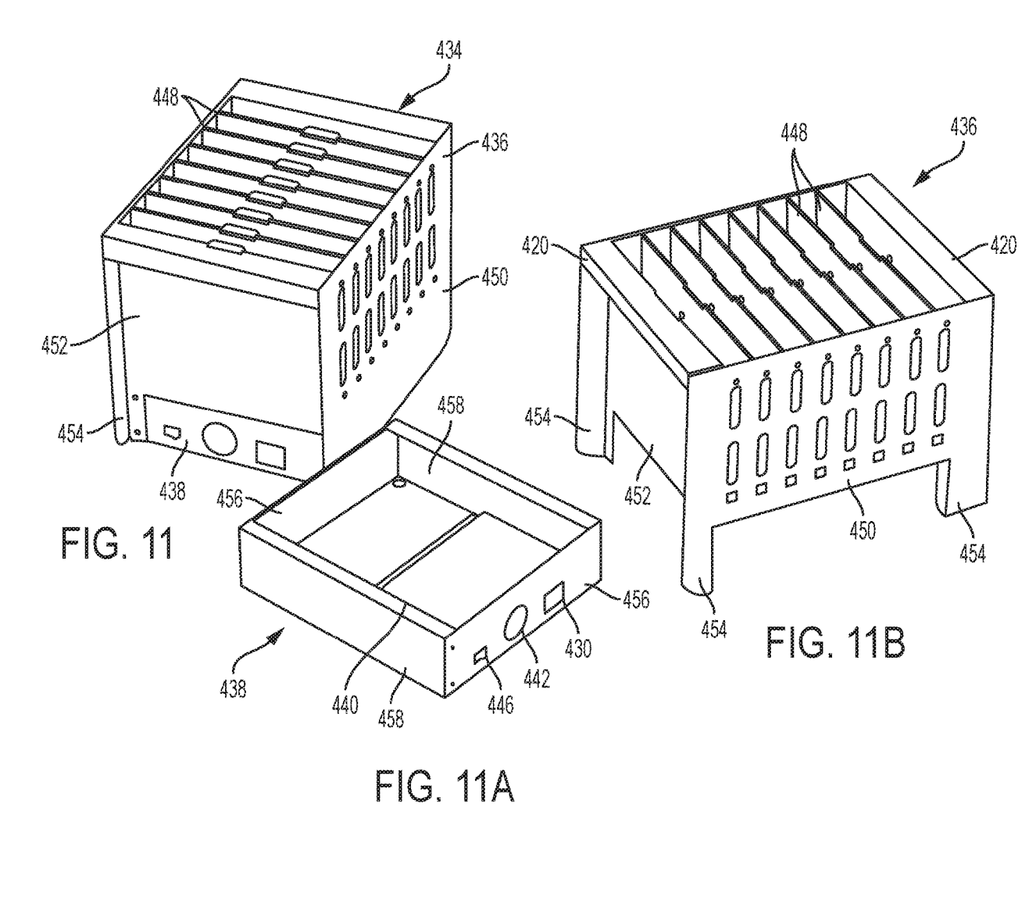
FIG. 11 is a perspective view of a wireless charging desktop rack, according to an aspect of the present invention.
FIG. 11A is an perspective view of a base pan of the wireless charging desktop rack of FIG. 11.
FIG. 11B is a perspective view of rack body of the wireless charging desktop rack of FIG. 11.
Figure 12:
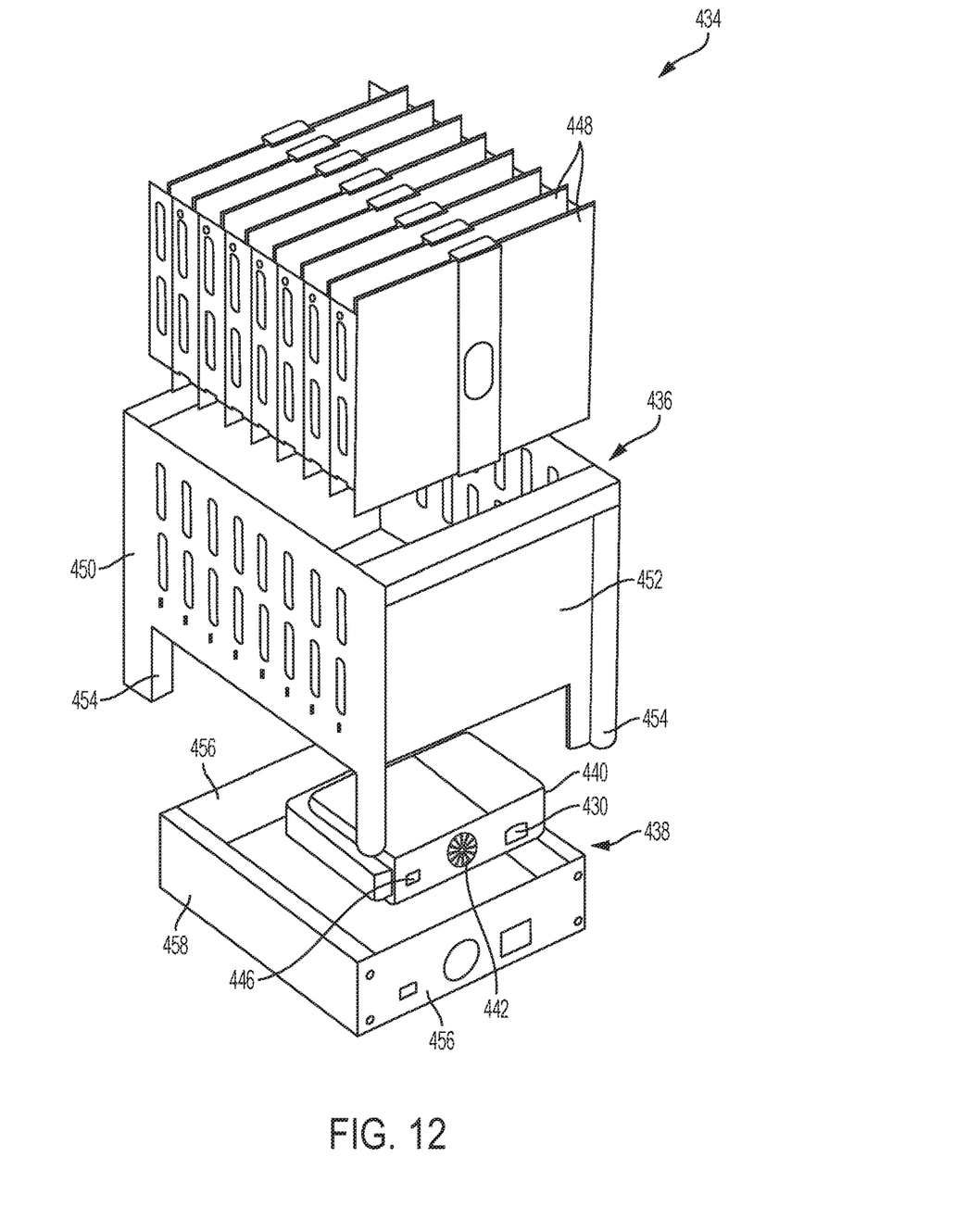
FIG. 12 is an exploded view of the wireless charging desktop rack of FIG. 11.

FIGS. 11-12 illustrate a wireless charging desktop rack 434, which is generally similarly constructed to tackle box 34. Each wireless charging desktop rack 434 has a rack body 436, a base pan 438, a set of dividers 448 and USB power unit 440. The base pan 438 includes the USB power unit 440, which has a fan 442, and power outlet 430, and power switch 446 that are positioned adjacent to apertures in one of a pair of opposing ends 456 of the base pan 438. The power outlet 430 is a three-prong AC power outlet that is electrically connected to the fan 442 of the USB power unit 440.

Individual chargers 38 are further connected to the USB power unit 440 to charge the electronic devices. The fan 442 is configured to cool the USB power unit 440 with cooling air from the outside environment.

The rack body 436 is constructed of sheet metal to join the base pan 438 and dividers 448. The rack body 436 has a pair of opposing side portion 450 and a pair of opposing end portions 452 that form an open box-like shape. Each end portion 452 is mounted medially of each side portion 450 such that each side portion 450 extends passed each end portion 452. Each end portion 452 sheet is bent to form a handle 420 at a top end of the rack body 436, opposite the base pan 438. Each handle 420 is generally flush with the top of the rack body 436 and each respective side portion 450. Furthermore, a set of legs 454 having an L-like shape are configured to fasten to opposing ends 456 of the base pan 438. In the illustrated embodiment one side of the L-like shaped leg 454 is formed by one each of the side portions 450 and the other side of the L-like shape leg 454 is formed by each of the end portions 454. Therefore, the base pan 438 removably fastens to the side of the L-like shaped legs 454 formed by each end portion 454.

The base pan 438 of the illustrated embodiment is constructed from at least one metal sheet. The metal sheet is bent to form a bottom between two opposing sides 458. The ends 456 are mounted between the sides 458 by fasteners to form a box-like shape. The base pan 438 is removably fastened to the rack body 436 at the ends 456 of the base pan 438 so the opposing sides 458 of the base pan are substantially flush with each side portion 450 and end portion 452 of the rack body 436.

The USB power unit 440 is configured to charge multiple personal electronic devices simultaneously. The USB power unit 440 is mounted by fasteners within the base pan 438 to the bottom and generally near one of the ends 456 to allow the chargers 38 to connect to the USB power unit 440. The USB power unit 440 includes a plurality of USB power ports to electrically connect to the chargers 38 and an AC power outlet 430. In the illustrated embodiment the USB power unit 440 is a commercially available unit, such as a UNITEK Y-2155 USB 10-port smart charging station. Alternative USB power units may be employed.

The dividers 448 of the wireless desktop rack 434 are configured substantially similar to the dividers 48 of the wireless cart 10, 100, 200, 300 to charge and separate personal electronic devices. Each charger 38 is mounted on the channel 74, which conceals wiring from the charger 38 to the USB power unit 440 of the base pan 438. Each divider 448 may have a bottom portion that is proximate to the base pan 438. Each bottom portion is configured to support an electronic device when inserted in the respective slot 36 such that the each electronic device is positioned to efficiently charge with the respective charger 38. The bottom portions may be formed by bending the divider 448, by mounting the bottom portion to the divider 448, or the like.

The rack body 436 includes side portions 450 with openings that generally correspond to the openings 46 of the dividers 448 for facilitating airflow to cool electronic devices stored therein. The top portion 40 of the rack body 436 is open with multiple dividers 48 being disposed within the rack body 436 and separating the side portions 450 to form receptacles or openings of slots 36 for receiving electronic devices therein.

With reference to FIGS. 7-10, various alternative embodiments of the cart may be employed. For example, the embodiments of the cart 100, 200, 300 include a working surface 110. The working surface 110 is generally opposite the mobile base 112 at a height from the mobile base 112 to facilitate users to work on objects placed on the working surface 110. Thus, the working surface 110 is generally near a top of the cart. In the illustrated embodiment, the working surface 110 is at a height near a waist level of an adult user, however, one would appreciate that the height may be a different levels based on the intended user or purpose. A charging box 34 may be disposed beneath the work surface 110.

Furthermore, the working surface 110 may be manufactured from different surfaces based on the intended user and purpose. In at least one illustrated embodiment, the working surface 110 is a hardwood top, which may be one of many types of wood, such as walnut, hickory, or maple. Alternatively, the working surface 110 may also be at least one of a synthetic material, such as plastic, or metal, ceramic, or a composite material. Nevertheless, the working surface 110 has a shape generally similar to the mobile base 112 and frame 118. Thus, the working surface 110 is fastened to the top of the cart 100, 200, 300, specifically the top portion of the frame 118. For example, the working surface 110 may be fastened to the frame 118 by fasteners that also fasten handles 120, as discussed below, to the cart 10, 100, 200, 300.

The cart 10, 100, 200, 300 includes handles 120. In at least one of the illustrated embodiments, the handles 120 are fixed to the top of the cart 100, 200, 300. Specifically, in the some embodiments, the handles 120 are fixed to the working surface (see FIGS. 7-9). The handles 120 are placed near the top of the cart 10, 100, 200, 300 to allow users to easily move the cart 10, 100, 200, 300 without additional strain. Therefore, one would appreciate that the handles 120 may be fixed to the frame 18, 118, between the mobile base 12, 112 and the top of the cart 10, 100, 200, 300, for example if the top of the cart 10, 100, 200, 300 is not near waist level of the intended user.

In the illustrated embodiments, the pair of handles 120, such as handle bars, are on opposite sides of the cart 10, 100, 200, 300 that span the entire side of each side of the cart 10, 100, 200, 300. Each end 122, 124 of the pair of handles 120 are fixedly attached to the top of the cart 10, 100, 200, 300. In the illustrated embodiment, the handles are formed of three parts, including the two opposing ends 122, 124, and a bar 126 between each end 122, 124. However, one would appreciate that other types of handles 120, such as knobs, may be used to move the cart, and the handles 120 may be placed in different locations on the cart, particularly relative to other handles 120, according to the intended users and purpose.

The storage areas 114, 115 are configured to hold and retain objects, such as personal electronic devices and accessories. In the illustrated embodiments, storage area 114 on carts 10, 100, 200, 300 is generally accessible from all sides between frame 118, while storage area 115 is generally accessible from two sides between frame 118. Each cart 10, 100, 200, 300 may have many storage areas 114, 115. For example, one cart 10, 100, 200, 300 may have storage areas 114, 115 above and below one another, and each storage area 114, 115 may be divided at least one of horizontally and vertically.

Figure 8:
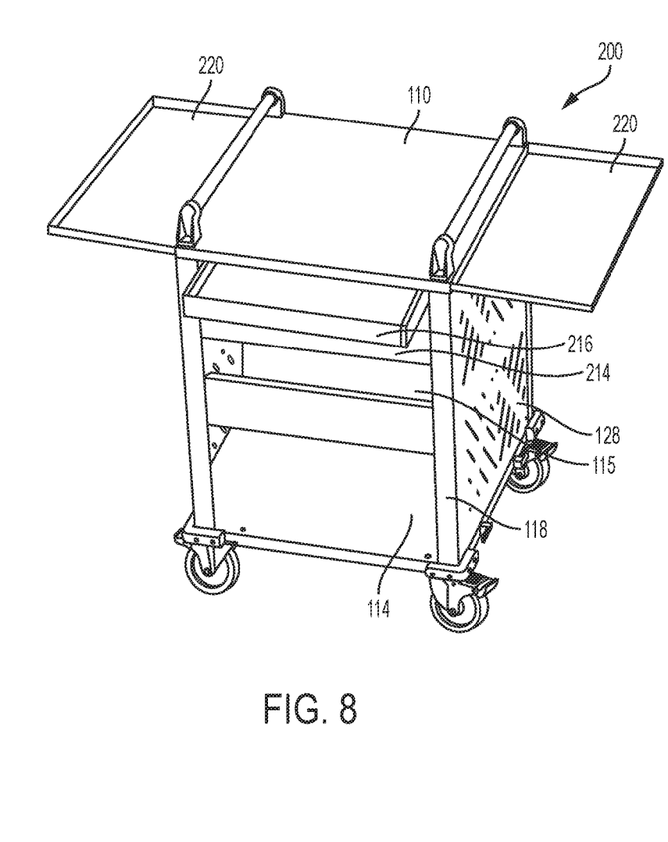
FIG. 8 is a perspective view of a third embodiment of a cart with extendable shelves and a drawer, according to an aspect of the present invention.
Figure 9:
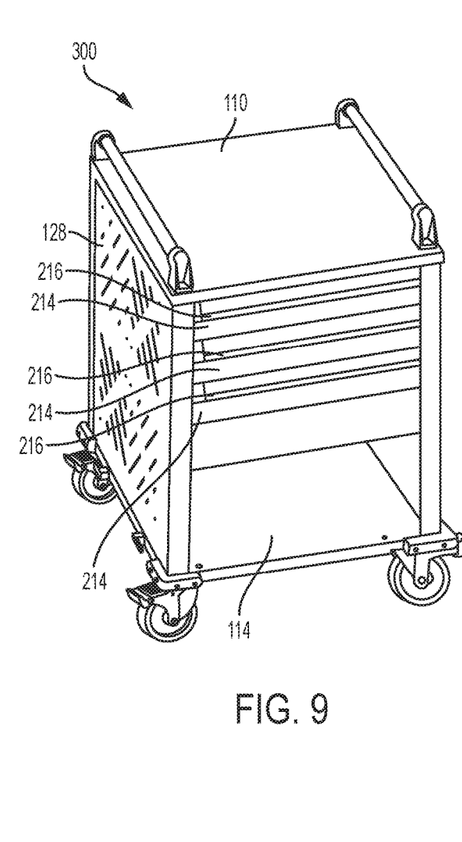
FIG. 9 is a perspective view of a fourth embodiment of a cart with multiple drawers, according to an aspect of the present invention.

Each cart 10, 100, 200, 300 may have many forms of storage areas 114, 115, such as a bin, drawer, surface, shelf, or tackle box. For example, FIG. 8 shows cart 200 with one drawer 214, and FIG. 9 shows cart 300 with three drawers 214. Each storage area 114, 115 may further have its own lock and handle 216. For example, each drawer 214, or bin with a door (not shown), may have a lock accessible by a key to prevent unauthorized users from accessing objects in the locked storage area. Furthermore, one illustrated embodiment includes an inner panel 129 without cooling vents adjacent the outer panel 128 and the storage area 114, 115 (see FIG. 7). One would appreciate that each of the inner panel 129 and outer panel 128 can optionally be a solid sheet, with or without cooling vents.

Each storage area 114, 115 of the cart 10, 100, 200, 300 may include at least one drawer 214 for storing objects, such as personal electronic devices and accessories. Each drawer 214 opens or slides laterally from within the frame 118 when a user pulls the drawer handle 216 on the drawer 214 to allow the user to access the storage area 114, 115. In the illustrated embodiments, drawer handles 216 extend across the drawer 214. One would appreciate that many types of handles 216, such as knobs, may be used to open and close drawers 214. Generally, the drawers 214 are supported by roller slides or carriages having ball bearings (not shown) to smoothly extend and support the drawer 214. Furthermore, carts 100, 200, 300 may include multiple drawers 214. For example, the cart 200 shown in FIG. 8 has one drawer 214, and the cart 300 shown in FIG. 9 has three drawers 214. One would appreciate that carts 10, 100, 200, 300 may have other numbers of drawers 214.

Each drawer 214 may have different volumes, as designed for their intended purpose. In the illustrated embodiments, each drawer 214 has a width that extends between opposing sides of the frame 118. Thus, the illustrated embodiments show one drawer 214 across a side of the cart 10, 100, 200, 300. However, one would appreciate that each drawer 214 may have shorter width (not shown), such that many drawers 214 may be set side-by-side across the side of the cart 100, 200, 300. For example, the one storage area may have two drawers that are side-by-side, such that each drawer a first drawer is a portion of the width of the side, and a second drawer extends the remaining portion of the width (not shown).

In another embodiment 200, shown in FIG. 8, extendable shelves 220 are configured to increase the capacity of the surface area of storage areas 114, 115, such as the working surface 110 (see FIG. 8). Each shelf 220, such as flip-up shelf is pivotably attached to the frame 118. The extendable shelves 220 have an extended position and stored position (not shown). In the extended position, the extendable shelves 220 are generally horizontal and flush with the working surface 110 so as to increase the surface area of the working surface 110 with minimal height difference between the working surface 110 and the extendable shelf 220. Alternatively, the extendable shelf 220 may have a lip (not shown) configured to contain objects on the shelf 220 when the shelf 220 is in an extended position. The lip extends substantially around a perimeter, in a direction substantially perpendicular to the surface of the shelf 220. For example, the lip may extend around three sides of the extendable shelf 220 having a rectangular shape, wherein the lip does not extend from the side adjacent and parallel to the working surface 110. Alternatively, the lip may extend around four sides of the extendable shelf 220 having a rectangular shape. One would also appreciate that the lip may extend around the extendable shelf 220 having a non-rectangular shape, such as arcuate, specifically semi-circular.

In the stored position the extendable shelves 220 hang substantially vertically from the hinges (not shown), such that the shelves 220 are proximate to the frame 118. Therefore, the shelves 220 may cover a portion of the frame 118 and side panels 128 when in the extended position. The extendable shelves 220 pivot between the stored and extended positions by a hinge coupled to the frame 118 and the extendable shelf 220. For example, the hinge may be a piano hinge or a butt hinge, or other types of hinges. In the illustrated embodiment, the extendable shelves 220 are flip-up shelves 220. However, one would appreciate the shelves 220 may be slide out shelves (not shown) to increase the surface area of the working surface 110. For example, the slide out shelves may slide or roll out from within the working surface 110. One would also appreciate that the extendable shelves 220 may also include supporting arms (not shown) to support the weight of the extendable shelves 220 and personal electronic devices on the shelves. For example, the supporting arms may attach to the shelves 220 and the side panels 128, and locked in place when the shelves 220 are extended, and fold when the shelves 220 are stored.

Figure 10:
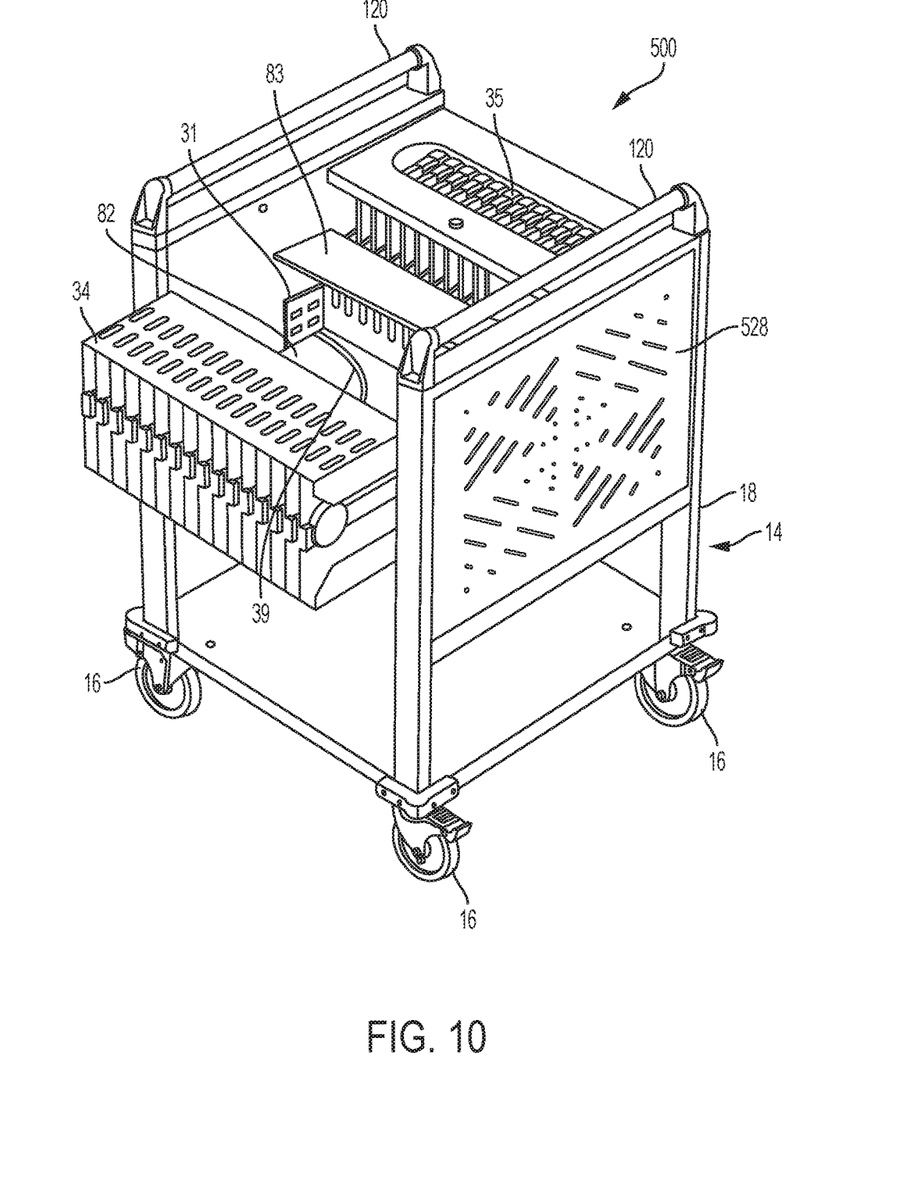
FIG. 10 is a perspective view of a fifth embodiment of a cart, wherein one tackle box is locked and one is pivoted outward, according to an aspect of the present invention.

A fifth embodiment is cart 500, illustrated in FIG. 10, is similar to other carts 10, 100, 200, 300. In particular, cart 500 includes a pair pivotable tackle boxes 34 and a pair of side panels 528 on two of opposing sides of the cart 500 with wheels 16. The tackle boxes 34 are arranged in parallel to each other and pivotably attached to cart 500 to receive, store, and charge personal electronic devices. The cart 500 is also configured to manage and distribute electricity from the power source to personal electronic devices on the cart 500 in the tackle boxes 34. Cart 500 may include power outlet 30 that is electrically connected to the power supply, generally positioned below the tackle boxes 34, to charge the electronic devices proximate to chargers 38.

The side panels 528 are configured to cover upper sides of cart 500 adjacent to the tackle boxes 34 and handle 120, and to expose all sides of the storage area 14 near the bottom portion of cart 500. Each side panel 528 is fixed or fastened to the frame 18 such that air passes between the sheets to cool the personal electronic devices through the openings, which may be an aesthetically pleasing design, advertising, logo, or the like.

Thus, the present invention discloses several embodiments of carts for charging, securing, and storing personal electronic devices, while also increasing increased mobility, ease of access, organization, and usefulness of personal electronic devices. Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A cart for charging and storing electronic devices, the cart comprising:
    a frame defining opposed sides of the cart, with the cart including wheels configured to enable the cart to be movable; and
    a charging box, the charging box including a plurality of dividers defining a plurality of receptacles configured to receive electronic devices for charging, with each receptacle including a charger configured to charge an electronic device;
    wherein the charging box is pivotably mounted to the cart between the opposed sides of the cart, with the charging box configured to pivot outwardly of the cart.

2. The cart of claim 1, wherein the charging box includes opposed side members and wherein the dividers extend between the side members.

3. The cart of claim 2, wherein each divider defines a channel at which the charger is mounted, and wherein wires from the charger extend within the channel and out of the charging box and are accessible when the charging box is pivoted outwardly.

4. The cart of claim 3, wherein the charging box includes an opening in a bottom portion of the charging box, and wherein wires from the chargers extend out of the opening to an interior central portion of the cart located between the opposed sides of the cart.

5. The cart of claim 1, wherein the frame includes a horizontal frame member, and wherein the charging box is hingedly connected to the cart at the horizontal frame member.

6. The cart of claim 5, wherein the charging box is configured to be supported on the horizontal frame member when the charging box is pivoted outwardly.

7. The cart of claim 1, wherein the charging box comprises a first charging box with the cart further including a second charging box pivotedly mounted to the cart between the opposed sides of the cart, with the second charging box configured to pivot outwardly of the cart in an opposite direction from the first charging box.

8. The cart of claim 7, wherein the cart includes an interior central portion disposed between the first charging box and the second charging box, and wherein wires from the chargers extend into the interior central portion and are accessible when the first charging box and the second charging box are outwardly pivoted.

9. The cart of claim 1, further including a locking frame pivotably mounted to the cart between the opposed sides of the cart and above the charging box, wherein the locking frame is pivotable between a secured position and an open position, and wherein electronic items stored within the charging box are accessible by a user when the locking frame is in the open position and electronic items stored within the charging box are inaccessible when the locking frame is in the secured position.

10. A cart for charging and storing electronic devices, the cart comprising:
- a frame defining opposed sides of the cart, with the cart including wheels configured to enable the cart to be movable;
- a charging box, the charging box including a plurality of dividers defining a plurality receptacles configured to receive electronic devices for charging, with each receptacle including a charger configured to charge an electronic device, wherein the charging box includes opposed side members with the dividers extending between the opposite side members and the chargers being mounted to the dividers; and
- a locking frame pivotably mounted to the cart between the opposed sides of the cart and above the charging box, wherein the locking frame is pivotably moved between a secured position and an open position, and wherein electronic items stored within the charging box are accessible by a user when the locking frame is in the open position and the electronic items stored within the charging box are inaccessible when the locking frame is in the secured position;
- wherein the charging box is pivotably mounted to the cart between the opposed sides of the cart, with the charging box configured to pivot outwardly of the cart.

11. The cart of claim 10, wherein the charging box includes an opening in a bottom portion of the charging box, and wherein wires from the chargers extend out of the opening to an interior central portion of the cart located between the opposed sides of the cart.

12. The cart of claim 10, wherein the frame includes a horizontal frame member, and wherein the charging box is hingedly connected to the cart at the horizontal frame member, and wherein the charging box is configured to be supported on the horizontal frame member when the charging box is pivoted outwardly.

13. The cart of claim 10, wherein the charging box comprises a first charging box with the cart further including a second charging box pivotedly mounted to the cart between the opposed sides of the cart, with the second charging box configured to pivot outwardly of the cart in an opposite direction from the first charging box, and wherein the locking frame comprises a first locking frame disposed above the first charging box, with the cart further including a second locking frame pivotably mounted to the cart between the opposed sides of the cart and disposed above the second charging box.

14. The cart of claim 13, wherein the cart includes an interior central portion disposed between the first charging box and the second charging box, and wherein wires from the chargers extend into the interior central portion and are accessible when the first charging box and the second charging box are outwardly pivoted.

15. A cart for charging and storing electronic devices, the cart comprising:
- a frame defining opposed sides of the cart, with the cart including wheels configured to enable the cart to be movable;
- a charging box mounted to the cart between the opposed sides of the cart, the charging box including a plurality of dividers defining a plurality of receptacles configured to receive electronic devices for charging, with each receptacle including a charger configured to charge an electronic device, wherein the charging box includes opposed side members with the dividers extending between the side members and the chargers being mounted to the dividers; and
- a locking frame pivotably mounted to the cart between the opposed sides of the cart and above the charging box, wherein the locking frame is pivotably moved between a secured position and an open position, and wherein electronic items stored within the charging box are accessible by a user when the locking frame is in the open position and electronic items stored within the charging box are inaccessible when the locking frame is in the secured position.

16. The cart of claim 15, wherein the locking frame is pivotably mounted to the frame adjacent an elongate edge of the locking frame to rotate thereabout.

17. The cart of claim 16, wherein the locking frame comprises a panel.

18. The cart of claim 15, wherein the charging box comprises a first charging box with the cart further including a second charging box mounted to the cart between the opposed sides of the cart, and wherein the locking frame comprises a first locking frame disposed above the first charging box, with the cart further including a second locking frame pivotably mounted to the cart between the opposed sides of the cart and disposed above the second charging box.

19. The cart of claim 18, wherein the first charging box and the second charging box are pivotably mounted to the cart between the opposed sides of the cart, with the charging boxes configured to pivot outwardly of the cart.

20. The cart of claim 19, wherein the cart includes an interior central portion disposed between the first charging box and the second charging box, and wherein wires from the chargers extend into the interior central portion and are accessible when the first charging box and the second charging box are outwardly pivoted.

\* \* \* \* \*